Jan. 22, 1935.      R. RIEGLER      1,988,750
VAPORIZER
Filed Oct. 31, 1930
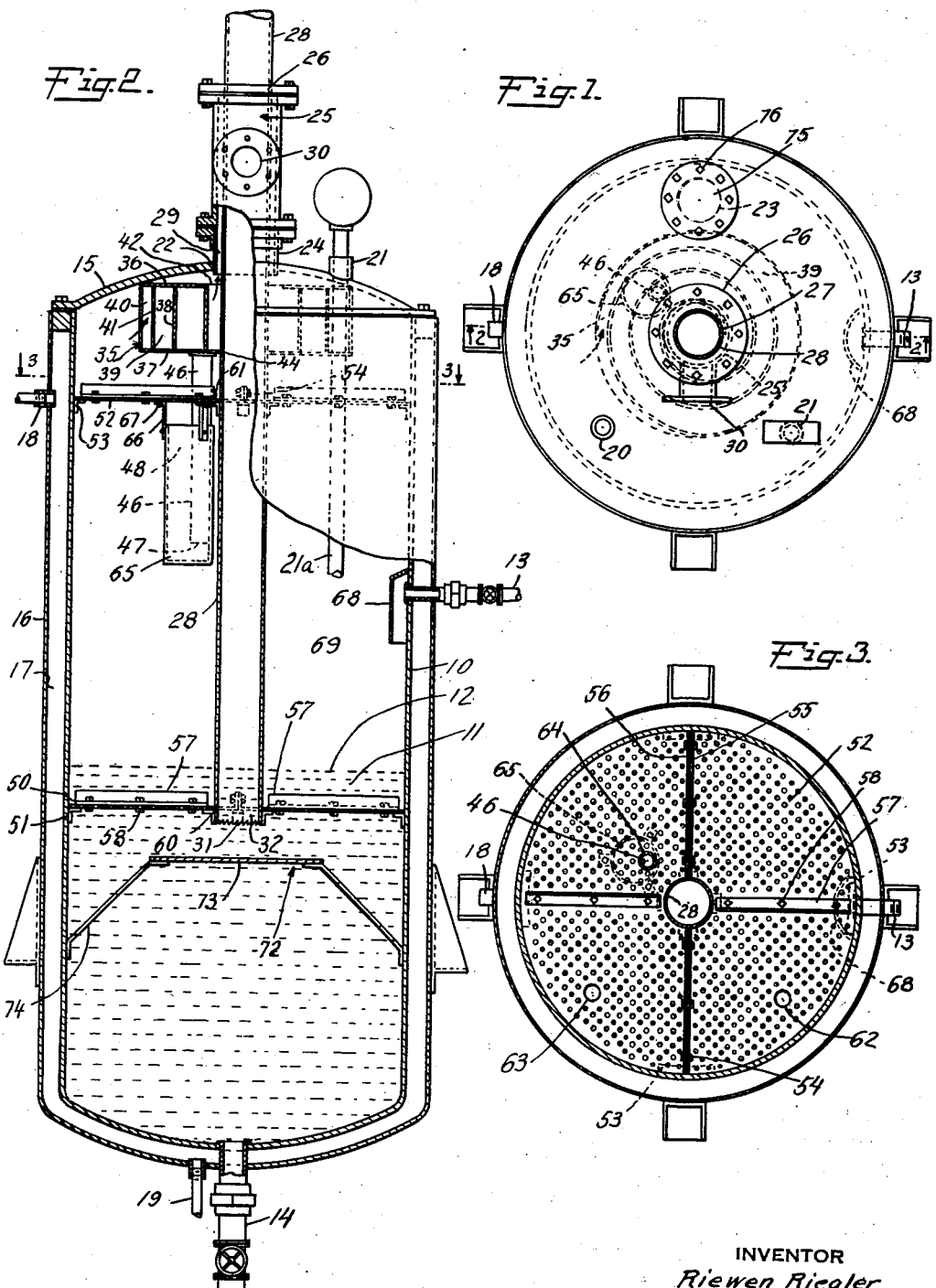
INVENTOR
Riewen Riegler
BY
ATTORNEY Patented Jan. 22, 1935

1,988,750

UNITED STATES PATENT OFFICE

1,988,750

VAPORIZER

Riewen Riegler, Buffalo, N. Y., assignor to National Aniline & Chemical Co. Inc., New York, N. Y., a corporation of New York Application October 31, 1930, Serial No. 492,521

5 Claims. (Cl. 261—123)

This invention is directed generally to vaporizing apparatus, and particularly to apparatus for saturating a gas with vapors of a liquid. More specifically, the invention is directed to the provision of an apparatus for forming a mixture of vapors of naphthalene with air.

The manufacture of several chemical products is effected by causing a reaction, under suitable conditions, between a gas and the vapors of a vaporizable material. An example of a process of this nature is the manufacture of partial oxidation products from organic compounds, such as naphthalene, anthracene, etc., which are solid under ordinary temperature conditions and have a relatively high vapor pressure at the melting points. In the production of phthalic anhydride, as is known in the art, vapors of naphthalene are mixed with air, the mixture is passed over a catalyst at an elevated temperature, and in the reaction produced thereby, the naphthalene is partially oxidized to phthalic anhydride. In such processes the necessary mixture is usually obtained by commingling the vapors with a flowing stream of the gas. It is desirable that the amounts of gas and the vapors entering admixture be under accurate control, that the mixture be free from entrained liquid or solid material, that a thorough dispersion of the vapor in the gas be obtained, and that generally the conditions existing in the mixture be subject to regulation and control.

Several forms of apparatus have been proposed for effecting the commingling of the vapors with the gas. Again referring to the production of phthalic anhydride from naphthalene by way of example, in accordance with one prior form of apparatus, the vaporizer comprises a large shallow, heated pan, adapted to contain the naphthalene in a liquid condition and means for blowing a current of air across the surface of the liquid. In another type of vaporizer, the naphthalene is retained in a heated kettle, and air is introduced into the body of the liquid through a perforated coil placed in the bottom of the kettle. In practice, the first mentioned apparatus offers the advantage that the naphthalene is not materially agitated by the air, and hence impurities in the naphthalene are permitted to settle. However, a comparatively large installation is required to effect vaporization of a relatively small amount of naphthalene. With regard to the second type of vaporizer, less floor space is required than where the shallow vaporizer is utilized, but on the other hand, the perforated coils are likely to become plugged, and there are the further serious disadvantages that the volume of air handled is small, and where an impure naphthalene is employed, impurities cannot readily settle and to a great extent become entrained in the air-vapor mixture. Attempts have been made to overcome the latter objection by including a separator in the line between the vaporizer and the catalyst chamber for extracting entrained liquids and condensed solids from the mixture during passage of the latter from the vaporizer to the reaction chamber. However, in practice, it has been found that operations have not been materially aided thereby because of the plugging of the separator on account of the cooling of entrained impurities, lack of control of the general condition of the air-vapor mixture in the separator, and the danger of a plug of the entrained impurities being carried over from the separator into the reaction chamber.

The principal object of the present invention lies in the provision of an apparatus constructed to overcome difficulties, such as those noted, which constantly arise when operating with prior equipment. The invention additionally aims to provide an apparatus capable of delivering purified vapors, such as naphthalene from crude naphthalene which may contain a relatively high percentage of high boiling impurities, and to further provide a vaporizer readily controllable to form and deliver relatively large volumes of gas-vapor mixtures, and which, at the same time, is so constructed as to occupy a minimum floor space.

Briefly, the invention comprises a closed, jacketed chamber or vessel constructed to receive and maintain in liquid form a vaporizable material, together with means for introducing, beneath the surface of the liquid, a stream of gas with which the vaporized material is to be mixed, an outlet for withdrawing the gas-vapor mixture from the vaporizing chamber, and a separator for removing entrained liquid from the mixture before the latter is withdrawn from the vessel. In one preferred embodiment, shown herein by way of illustration, the invention includes a covered, heated vessel forming a vaporizing chamber, a dip-pipe projecting downwardly through the cover of the vessel to a point somewhat below the normal level at which the liquid is maintained, and through which pipe the gas is introduced into the liquid, and a baffle-plate or spreader mounted in the vessel below, and in proximity to the mouth of the dip-pipe. The arrangement and construction of the dip-pipe and the baffle-plate or spreader are such that a maximum initial dispersion of the gas into the liquid is effected, while at the same time, the maintenance of a relatively quiescent zone in the body of the liquid is permitted so as to facilitate, and not to interfere with, the settling out of impurities in the liquid. The invention further comprises a construction in which the separator is built within the vaporizing chamber proper, so that a substantially complete separation of the entrained liquid particles from the outgoing gas-vapor mixture may be accomplished before the mixture passes beyond the heated atmosphere of the vaporizing chamber, thus maintaining separated liquid impurities in the liquid form, permitting the return of the liquid to the vaporizing zone, and avoiding plugging of the separator because of the accumulation of solidified impurities with the attendant difficulties arising therefrom.

The invention accordingly comprises the features of construction, combination of elements, and arrangement of parts which will be exemplified in the construction hereinafter set forth, and illustrated in the accompanying drawing in which Fig. 1 is a plan view of the top of the vaporizer;

Fig. 2 is a partial sectional elevation of the vaporizer taken along the line 2—2 of Fig. 1, and Fig. 3 is a sectional view of the vaporizer taken along the line 3—3 of Fig. 2.

In the drawing, the vaporizer comprises a chamber or kettle 10 which in operation, is normally filled with molten naphthalene or other vaporizable liquid 11 to approximately the level indicated by the reference numeral 12. The vaporizer is provided on one side, well toward the top, with a valved inlet 13 through which molten naphthalene or other liquid to be treated may be introduced into the chamber, and at the bottom with a valve controlled draw-off connection 14. The top of the chamber is closed off by a cover 15, bolted at several points on its periphery to a ring set between the upper edges of the kettle 10 and the shell 16. With the outer wall of the kettle, the shell 16 forms a jacketing chamber 17 by means of which the contents of the kettle may be readily maintained in the liquid state. A temperature regulating and heating agent, such as steam, hot oil, etc. may be circulated through the chamber 17, through pipe connections associated with the jacket, inlet 18 and outlet 19.

In the cover 15 are the openings 20 and 21, serving to accommodate, respectively, a thermometer well 21a, a liquid level indicator (not shown), the main outlet opening 22, and a fourth opening 23 for a purpose which will appear hereinafter.

Set into the opening 22 and suitably fixed to the cover 15, as by welding, is a pipe 24 having connected thereto a T indicated generally by the reference numeral 25. The vertical section of the T 25 is closed at its upper end by a circular plate 26 having an opening 27 of a diameter less than that of the bore of the vertical section of the T. The dip-pipe 28, passing through the opening 27, extends downwardly into the kettle 10, and terminating at a point between the bottom of the kettle and the normal operating surface level 12 of the liquid, serves to introduce air or other gas into the molten naphthalene or other liquid in the vaporizer. Formed between the outer wall of the pipe 28 and the inner walls of the T 25 and pipe 24, is the annular passage 29 communicating with the discharge opening 30 of the T, and affording an outlet for the mixture of air and vapors produced in the vaporizer. The pipe 28 is provided with serrations 31 at its lower end 32 to facilitate equal distribution of the air into the vaporizable liquid 11.

A separator indicated generally at 35, is constructed within the kettle, immediately beneath the cover 15, for the purpose of removing from the mixture of gas and vapor, before it leaves the vaporizer, any material in liquid or solid condition contained in the mixture. The separator 35 is preferably a spiral centrifugal separator, comprising the circular top and bottom plates 36 and 37 connected by an interposed spiral member 38, forming with the top and bottom plates, a spiral passage 39. The separator may be fixed to the underside of the cover, as by welding, at the periphery of the upper plate 36. The space 40 between the outer end of the member 38 and its first adjacent convolution 41 provides an inlet for the vapor mixture; and an opening 42 in the center of the top plate 36, of greater diameter than that of the dip-pipe 28, forms a vapor outlet connecting with the annular passage 29. The bottom plate 37 of the separator has two openings 44 and 45. Opening 44 receives the dip-pipe 28 to which the plate 37 is suitably sealed, for example by welding, in order to prevent the gas mixture from leaking into the outlet passage 29 without passing through the separator. A pipe 46 welded to the underside of the bottom plate 37, communicates with the opening 45 and affords a return pipe for the liquid removed from the gas mixture by the separator 35. The lower end 47 of the pipe 46 projects into a liquid seal 48 which prevents the gas mixture from escaping from the vaporizer, by way of pipe 46 and the separator outlet 42, without passing completely through the entrainment separator 35. In a separator of this type, the gas and entrained material are thrown against the side plate by centrifugal force, and once separation has been effected, the foreign matter does not contact again directly with the gas stream, but instead flows down the side plates to the bottom plate 37 and is thence discharged through opening 45 and pipe 46 into the bottom of the liquid seal.

Additional dispersion and distribution of the air or other gas through the upper layer of the liquid 11 is effected by a foraminous plate 50, supported by angle bars 51 which are welded or otherwise suitably secured to the inner wall of the kettle 10 at a point between the normal surface level 12 of the vaporizable liquid and the lower end 32 of the pipe 28. A second foraminous plate 52, similarly supported by angle bars 53 suitably attached to the inner wall of the kettle near the upper edge thereof, acts primarily as a mixing screen for the vapors and air, or other gases, to produce a more uniform intermixture of the two and further serves to remove from the gas stream a portion of the entrained particles of unvaporized liquid, such as naphthalene or higher boiling impurities. The screen 52 additionally assists in producing vaporization by disintegrating particles of the vaporizable liquid rising with the gas stream.

Members 50 and 52 are, as shown, each formed of two semi-circular perforated plates held together by bolts 54 passing through suitable openings in the vertically disposed lips 55 and 56 formed on the adjacent edges of said plates, thus permitting ready removal and assembly of the plates for replacement or cleaning. Each plate has a perforated angle bar 57 secured to it, as by bolts 58, serving as a stiffening brace to resist warping, for example, in the event of an explosion in the vaporizer. The members 50 and 52 have openings 60 and 61, respectively, for the dip-pipe 28. The upper plate 52 has openings 62, 63 and 64 for the thermometer well, the liquid level indicator, and the return pipe 46, respectively.

A cylindrical cup 65 is supported by straps 66, the upper ends of which are suitably fastened to the upper foraminous plate 52 as by bolts 67, in such manner as to enclose the lower end 47 of the pipe 46. The cup is adapted to contain the liquid forming the seal 48, which, in operation, may be entrained liquid returned through the pipe 46.

Suitably secured to the inner wall of the kettle 10 is a hood 68 partially enclosing the inlet opening 13, and arranged to prevent liquid fed into the vaporizer from spraying out into the gas space 69, and thus becoming entrained in the rising gas-vapor mixture.

Mounted in the kettle 10 beneath the foraminous plate 50 is a spreader or baffle indicated generally by the reference numeral 72. The baffle comprises a circular plate 73 having a diameter appreciably greater than that of the dip-pipe 28 but of less diameter than that of the kettle 10. As indicated, the plate 73 is horizontally disposed, and is supported in position shown in the drawing by a plurality of brackets 74 which are welded or otherwise suitably attached at their ends to the periphery of the plate 73 and to the inner surface of the kettle 10. The plate 73 is spaced from the lower end of dip-pipe 28, and serves to break up the incoming gas stream at the mouth of the dip-pipe and spread the gas stream laterally into the upper layer of the molten liquid, thereby preventing the gas stream from descending into the lower zone of the liquid thus setting up currents in the liquid which tend to prevent settling of impurities.

The opening 23 in the cover 15 is normally closed by a relatively thin metal plate 75 secured to the cover 15 as by bolts 76, and adapted to withstand the normal working pressures existing in the vaporizer, but not abnormally high pressures. Accordingly, in the event of an explosion or similar sudden increase in pressure in the vaporizer or the gas lines connected to it, the plate 75 will be ruptured and the pressure relieved without causing damage to the apparatus.

The operation of the vaporizer above described will be briefly explained in connection with the preparation of a mixture of naphthalene and air, for use, for example, in the manufacture of phthalic anhydride by catalytic partial oxidation of naphthalene, or in the purification of naphthalene by vaporization and partial condensation of the vapors. The invention is not limited, however, to the treatment of naphthalene with air, but may be employed for mixing vapors of any suitable vaporizable liquid with any suitable gas.

Referring to the drawing, the vaporizer is filled to the level 12, with a relatively crude naphthalene (for example, one having a melting point below 80° C. and containing anthracene and other tarry, high-boiling impurities), which is introduced in molten condition through the inlet 13. Steam is supplied to the temperature-regulating jacket 17 through inlet 18 at a rate sufficient to maintain the kettle 10 at the desired temperature above the melting point of the naphthalene, for example, 90° to 150° C. Heated air, preferably at approximately the temperature of the naphthalene, is passed into the vaporizer through dip-pipe 28 under a pressure sufficient to overcome the resistance of the vaporizer and subsequent units of the system, for example, five to forty or more pounds per square inch. The entering air is dispersed circumferentially into the naphthalene by the serrations 31, and the baffle-plate or spreader 73, and is distributed through the upper layer of the naphthalene by the foraminous member 50. The latter member, by breaking up the air stream into a multitude of small streams, reduces agitation of the naphthalene, and thereby mitigates entrainment by the air stream of impurities contained in the naphthalene. The air passing through the naphthalene, the vapor pressure of which is high at the existing temperature, soon becomes saturated with naphthalene. If some of the air is not saturated during its passage through the molten naphthalene, it becomes saturated by the vapors of naphthalene which fill the gas space 69. This completion of saturation is assisted by the foraminous member 52, which also acts as a baffle for the gas stream. The air-naphthalene vapor mixture then passes through the separator 35, where entrained material in solid or liquid form is removed, and finally leaves the vaporizer through outlet 30. Additional molten naphthalene is introduced, continuously or periodically (as desired), through inlet 13 as it is used up.

It will be noted that only the upper zone of the liquid, i. e., that portion above the baffle-plate 72, is agitated by the air, the lower zone remaining quiescent. Foreign matter, once in the lower zone, is retained there and quietly settles to the bottom where it can be drained off.

The apparatus of the invention is of especial advantage in the treatment of a crude naphthalene containing high-boiling impurities because, on account of the improved construction, the degree of agitation produced by the gas stream is not so great as to prevent such impurities from settling to the bottom of the vaporizer, where they are out of contact with the gas stream and therefore do not become entrained in it. The impurities accumulating in the bottom of the vaporizer may be periodically drawn off through outlet 14. A further material advantage from an operating viewpoint arises from the present invention on account of the construction by which the separator becomes an integral part of the vaporizer. It will be seen that all parts of the separator are maintained at substantially the same temperature as that prevailing in the vaporizing chamber and hence there is little or no tendency for the separated impurities to solidify and clog the separator. A maximum separation of impurities from the gas stream is effected in the spiral passage 39, and the separated substances are constantly returned to the main body of liquid in the vaporizer through the drain pipe 46 and the cup 65.

The invention is not limited to the above description but is capable of variation in the details of construction, arrangement, and combination of the component parts as will be evident to one skilled in the art. Thus, for example, other types of separator may be employed instead of the spiral centrifugal separator above illustrated. The plates 50 and 52 may be omitted but are preferably included for maximum efficiency in operation. The baffle-plate or spreader 72 also may be omitted, but its inclusion is preferred owing to its action in increasing the quiescence of the lower zone and thereby the settling of high-boiling impurities. The invention also preferably includes a construction which comprises a spreading and dispersing means associated with the dip-pipe.

Since certain changes may be made in the above construction and different embodiments of the invention may be made without departing from the scope thereof, it is intended that all matter contained in the above description or shown in the accompanying drawing shall be interpreted as illustrative and not by way of limitation.

I claim:

1. In an apparatus of the character described, a vessel adapted to contain a body of vaporizable material in molten condition, means for heating the vessel to vaporize the same, means for introducing a gas into the material comprising a pipe having an outlet below the normal surface level of said material, means including a foraminous member located adjacent the outlet of said pipe for distributing the gas equally throughout the upper portion of the material, a foraminous member located above the normal surface level of said material for mixing the gas and vapor, means for discharging the vapor-laden gas from said vessel, means within the vessel operatively connected with said discharge means for removing entrained matter from the vapor-laden gas, and means including a liquid seal for returning said entrained matter to said body of material.

2. In an apparatus of the character described, a vessel adapted to contain a vaporizable normally solid material in molten condition and containing non-volatile impurities, means for introducing a gas downward into said material comprising a pipe having an outlet below the normal surface level of said material, means including a foraminous member located adjacent the outlet end of said pipe for distributing the gas equally into the upper portion of the material, a plate located below the outlet of said pipe and adapted to disperse the gas issuing from said pipe laterally into said material, means for discharging the vapor-laden gas from said vessel, a spiral separator within the vessel for removing entrained non-volatile impurities from said vapor-laden gas, and means for returning said entrained impurities to said body of material.

3. In an apparatus of the character described, a vessel adapted to contain a body of vaporizable normally solid material in molten condition and containing non-volatile impurities, means for heating the material, a pipe having an outlet below the normal surface level of said material for introducing a gas into the material, means including a foraminous member located adjacent the outlet of said pipe and below said normal surface level for distributing the gas equally into the upper portion of the material, means located above the normal surface level of said material for mixing the gas and vapor, an outlet located above the last mentioned means for discharging the vapor-laden gas from said vessel, a spiral separator within said vessel for removing entrained non-volatile impurities from said vapor-laden gas, a pipe connected to the base of the separator for returning said entrained impurities to the body of material, and means associated with said pipe for preventing the vapor-laden gas from passing through the said pipe to the vessel outlet without passing through the separator.

4. A vaporizing apparatus comprising a vessel adapted to contain a body of vaporizable material, means for heating the vessel, a pipe for passing a gas through the material extending downwardly through the top of the vessel and having an outlet below the normal surface level of the material, means associated with the outlet of the pipe for dispersing the gas into the upper portion of the material, perforated mixing plates in the said vessel, one of said plates being disposed above and the other below the normal surface level of the material, an outlet for discharging vapor-laden gas from the vessel, a spiral separator in the vessel for removing entrained liquids and solids from the vapor-laden gas prior to the passage of the same through the vessel outlet, and means including a liquid seal for returning entrained matter from the separator to the body of material in the vessel.

5. A vaporizing apparatus comprising a vessel adapted to contain a body of vaporizable material, means for heating the vessel, a baffle-plate horizontally mounted in said vessel below the normal surface level of said material, a pipe for introducing a gas into the material extending downwardly through the top of the vessel and having an outlet opening below the normal surface level of the material but above said baffle-plate, perforated mixing plates in the said vessel, one of said plates being disposed above and the other below the normal surface level of said material, an outlet for discharging vapor-laden gas from the vessel, a spiral separator in the vessel connected to said outlet for removing entrained liquid and solids from the vapor-laden gas prior to the passage of the same from the vessel, a pipe leading from the separator for withdrawing removed matter from the separator, and a cup adapted to contain liquid enclosing the outlet end of said pipe to form a seal for said outlet.

RIEWEN RIEGLER.

CERTIFICATE OF CORRECTION.

Patent No. 1,988,750. January 22, 1935.

RIEWEN RIEGLER.

It is hereby certified that error appears in the printed specification of the above numbered patent requiring correction as follows: Page 4, first column, line 14, claim 1, strike out the words "in molten condition"; same column and claim, line 15, strike out the words "to vaporize the same " and insert the same after "material" in line 52, of claim 3; and that the said Letters Patent should be read with these corrections therein that the same may conform to the record of the case in the Patent Office.

Signed and sealed this 12th day of March, A. D. 1935.

Leslie Frazer
Acting Commissioner of Patents.

(Seal)